(12) United States Patent
Williamson (10) Patent No.: US 12,330,455 B1
(45) Date of Patent: Jun. 17, 2025

(54) RETAINER BRACKET

(71) Applicant: Richard Leslie Williamson, Ocala, FL (US)

(72) Inventor: Richard Leslie Williamson, Ocala, FL (US)

( * ) Notice: Subject to any disclaimer, the term of this patent is extended or adjusted under 35 U.S.C. 154(b) by 0 days.

(21) Appl. No.: 18/758,668

(22) Filed: Jun. 28, 2024

(51) Int. Cl.
*B60D 1/48* (2006.01)

(52) U.S. Cl.
CPC ...................... *B60D 1/48* (2013.01)

(58) Field of Classification Search
CPC ........................................... B60D 1/48
USPC ..................................... 248/221.12
See application file for complete search history.

(56) References Cited

U.S. PATENT DOCUMENTS

| 1,186,482 A * | 6/1916 | Kline | B60D 1/167 |
| | | | 280/474 |
| 5,765,881 A * | 6/1998 | Perner | F16L 23/032 |
| | | | 285/415 |

OTHER PUBLICATIONS

"Lasco Chrome-Plated Floor & Ceiling Split Plate," R.P. Lumber, 2024, p. 1 [retrieved from: https://shop.rplumber.com/c/plumbing-supplies/drains-drain-fitting/foor-wall-flanges/p/lasco-split-plate-6].

* cited by examiner

*Primary Examiner* — James A English
*Assistant Examiner* — Felicia L. Brittman-Alabi
(74) *Attorney, Agent, or Firm* — SALIWANCHIK, LLOYD & EISENSCHENK (57) ABSTRACT

Retainer bracket and methods for removably securing a cross beam to a supporting structure, such as that on a trailer, are provided. A retainer bracket can include an anchor plate with an aperture back edge and paired side arms with a flange and a lock plate with an aperture front edge and paired shanks with notches. The flange on the anchor plate and notch on the lock plate are cooperatively engaged to form a retainer bracket for securing the cross beam.

19 Claims, 10 Drawing Sheets

RETAINER BRACKET

BACKGROUND OF INVENTION

Utility trailers that are towed behind vehicles require a tongue and a hitch for attachment to the vehicle. A tongue can be rigidly attached directly to the trailer. Alternatively, the tongue can be attached to a cross beam secured parallel to the front of the trailer. For trailers having a drop body that can be lowered for loading and raised for towing, it can be helpful for the cross beam to be capable of rotation about the longitudinal axis, so the tongue can tilt vertically as the body moves.

Retainer plates are typically utilized to secure a cross beam to a trailer. A retainer plate is usually a monolithic piece having an aperture or cavity for securing one end of the cross beam. The cross beam is positioned in front of the trailer and a retainer plate at each end is secured to the trailer body. Typically, the retainer plates are secured by welding, which makes for a strong attachment but also makes the retainer a substantially permanent fixture. During installation, the cross beam and retainer plates are held in the exact position for attachment to the trailer. This can be a difficult endeavor, particularly more so for heavy duty cross beams and retainer plates. Additionally, welding the retainer plate makes repair or replacement more difficult and removing the welded retainer plate can affect the structural integrity of the trailer. For these reasons, there is a need for a retainer plate apparatus that can both attach a cross beam to a trailer without having to support the cross beam throughout the installation process and that provides modularity so the cross beam can be removably attached to a trailer.

BRIEF SUMMARY

The subject invention solves the dual problem of supporting a cross beam for installation and providing modularity, so the cross beam can be removed without damage to the supporting structure. Embodiments of the subject invention pertain to an apparatus with components that can be advantageously cooperatively engaged during installation to actually support the cross beam while those same components are utilized to removably attach the cross beam to a trailer. The apparatus comprises a retainer bracket having interconnecting components with features that not only secures the cross beam to the supporting structure, such as a trailer, but also support the cross beam in place during the installation. The interconnectable components also allow the retainer bracket to be attached to the trailer with removable connectors. This provides modularity to the cross beam.

Embodiments of the retaining plate have at least two components that when interconnected form an aperture that receives and supports the cross beam, usually, but not exclusively, at an end thereof. A first component can be attached or anchored to a supporting structure on the trailer. The cross beam can then be positioned between the first component and the second component. The second component can slide laterally or parallel to the cross beam to interconnect with or lock with the first component attached to the trailer. The second component can then also be removably attached to the trailer. When the first and second component laterally interconnect, features on each component inhibit their disconnection in any non-lateral direction, or across any edge, thereby holding the cross beam in place therebetween. In other words, a force applied in a direction towards an edge of the retainer bracket is inhibited from disengaging the components, thereby holding the cross beam in place therebetween, when the cross beam applies force against the aperture walls. Advantageously, the features that allow for interconnection of the two components can also assist in distributing the force applied to the retainer bracket by the cross beam during towing.

In one embodiment, the first component is an anchor plate that is connected to the trailer, such as, for example, to a forward extension of the trailer. The anchor plate can have paired side arms that have an outer edge and an aperture back edge therebetween that forms a portion of the aperture. One or both paired side arms can further have at least one flange that extends or juts out from the outer edge.

In a further embodiment, the second component is a lock plate that cooperatively engages with the anchor plate. The lock plate can have paired shanks that slide laterally over the paired side arms or, stated another way, one component fits into the other and interdigitates with the paired side arms of the anchor plate. This can position the side arms and the shanks effectively parallel to each other. An aperture front edge between the paired shanks defines another portion of the aperture, such that the anchor plate and the lock plate, when cooperatively engaged form the complete aperture that receives the cross beam. A shank can further have an inside edge with at least one notch formed therein and positioned to interconnect or cooperatively engage with the at least one flange on the outer edge of a side arm of the anchor plate. When the anchor plate and lock plate are laterally engaged, the one or more flanges can slide laterally or sideways into the one or more notches.

For the retainer bracket to secure a cross beam, one of the components, the anchor plate or the lock plate can be attached to a supporting structure of a trailer, such as, for example, where each end of the cross beam is to be secured. For example, the anchor plate can be secured with the paired side arms directed out or away from the trailer body to provide access to the aperture back edge. The cross beam can be placed against the aperture back edge. A lock plate can be placed over the cross beam with the cross beam between the shanks and near the aperture front edge. The cross beam can be placed against the aperture back edge of the anchor plate and then the lock plate can slide laterally or parallel to the cross beam toward with outer surface of the anchor plate. The notch on the lock plate can be aligned to slide over and cooperatively engage with the flange on the anchor plate. This cooperatively engages the lock plate with the anchor plate, forms the complete aperture with the cross beam therein and, advantageously, holds the cross beam in place on the trailer, while additional connectors are used to secure the lock plate to the trailer. Thus, the cross beam can be temporarily supported by the cooperatively engaged anchor plate and lock plate while the anchor plate is more securely attached to the trailer, at which point the cross beam will be entirely supported by the retainer bracket.

When towing the trailer, the tongue exerts a pull force on the cross beam that is translated to the retainer bracket, as well as, to the connectors that attach the components of the retainer bracket to the trailer. The flanges and notches of the retainer bracket advantageously assist in the distribution of the pull force throughout the retainer bracket. The distribution of the pull force across the retainer bracket and to the connectors can inhibit shear, fracture, or other failure of the retainer bracket components. Proper distribution of the pull forces also has the potential to increase the load or towing capacity of the trailer. The ability to attach the retainer bracket with removable connectors, as opposed to typical welding, provides not only more efficient installation, but also modularity to the cross beam and other apparatuses attached thereto.

BRIEF DESCRIPTION OF DRAWINGS

To provide a more precise understanding of the above recited invention, a more particular description of the invention briefly described above will be rendered by reference to specific embodiments that are illustrated in the appended drawings. The drawings presented herein are not drawn to scale. Any reference to dimensions in the drawings or in the following description, implied or otherwise, are specific to the embodiments disclosed. It will be understood that any variations of the dimensions that will allow the subject invention to function for its intended purpose are within the scope of the subject invention.

FIGS. 2A, 2B, 2C, and 2D illustrate different views of an embodiment of the retaining plate, where.

DETAILED DESCRIPTION

The subject invention pertains to embodiments of a retainer bracket that can be secured to a supporting structure to support a cross beam. More specifically, the subject invention provides one or more embodiments of a retainer bracket comprising components that can be interconnected or cooperatively engaged to support the cross beam during both installation and in use, such as when towing a trailer. In addition, once attached to the supporting structure, the retainer bracket can more effectively distribute forces exerted by the cross beam. In a specific embodiment, the retainer bracket can support a cross beam and effectively distribute forces translated from a tongue to the cross beam and across the retainer bracket during towing.

While the subject invention is described for a specific use in securing a horizontal cross beam that supports a trailer tongue, the invention is not limited to such use nor to a solely horizontal position. Therefore, other modifications that would be apparent to a person of skill in the art and having benefit of the subject disclosure are within the scope of the present invention.

In the description that follows, terms related to the field of the invention, such as those pertaining to the mechanisms utilized for towing trailers, are utilized. To provide a clear and consistent understanding of the specification and claims, including the scope to be given to such terms, the following definitions are provided:

The term "cross beam" is used herein merely for literary convenience. The term refers to any device, mechanism, or object that can be received in and secured by an aperture of a retainer bracket, according to the subject invention. This can include, but is not limited to, any elongated tube, pipe, rod, stem, post, neck, stick, or the like having at least one end capable of being secured with a retainer bracket, as described herein. A cross beam can also have any circumferential shape, including round, square, oval, triangular, or variations or combinations thereof.

The term "connector," as used herein, refers to any device, material, or mechanism by which at least a portion of a retaining plate of the subject invention can be attached to a supporting structure. This can include, but is not limited to removable connectors such as, for example, nuts, bolts, screws, pins, nails, staples, straps, expandable anchors, other similar types of devices and combinations thereof that can provide modularity to the retainer bracket by being removable without adversely affecting the integrity of the supporting structure.

The term "supporting structure," as used herein, refers to a stationary or mobile structure to which at least a portion of a retaining plate of the subject invention can be removably attached.

As used herein, and unless otherwise specifically stated, the terms "operable communication," "operable connection," "operably connected," "cooperatively engaged" and grammatical variations thereof mean that the particular elements are connected in such a way that they cooperate to achieve their intended function or functions. The "connection" or "engagement" may be direct, or indirect, physical or remote.

As used herein, terms indicating relative direction or orientation, including but not limited to "upper", "lower", "top", "bottom", "vertical", "horizontal", "outer", "inner", "front", "back", "left", "right" and the like, are intended to facilitate description of the present invention by indicating relative orientation or direction in usual use, and are not intended to limit the scope of the present invention in any way to such orientations or directions.

The terms "about" or "approximately," as used herein, are defined as at least close to a given value or to either end of a range. For example, these terms can indicate that a characteristic, parameter, or value is as close as is necessary to achieve the intended purpose or operation, or to cover manufacturing variances, equipment tolerances, and normal variances in material, as would be understood by those skilled in the art.

The transitional term "comprising," which is synonymous with "including," "having," or "containing," is inclusive or open-ended and does not exclude additional, unrecited elements or method steps. Conversely, the transitional phrase "consisting of" excludes any element, step, material, or component not specified in the claim. Use of the term "comprising" contemplates other embodiments that "consist" or "consist essentially of" the recited component(s).

Any reference to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

The present invention is more particularly described in the following examples that are intended to be illustrative only because numerous modifications and variations therein will be apparent to those skilled in the art. As used in the specification and in the claims, the singular for "a," "an" and "the" include plural referents unless the context clearly dictates otherwise.

For a clear understanding of the invention, while eliminating, for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

Reference will be made to the attached figures on which the same reference numerals are used throughout to indicate the same or similar components. With reference to the attached figures, which show certain embodiments of the subject invention, it can be seen that a retainer bracket 100 of the subject invention comprises two components: an anchor plate 110 with paired side arms 111 and a lock plate 130 with paired shanks 131. Each side arm can have at least one flange 115 along one side and on the opposite side an aperture back edge 32 therebetween, which forms a portion of an aperture 30 for receiving a cross beam 10. Each shank on a lock plate 130 can have at least one notch 137 configured to engage with the corresponding at least one flange on a side arm and an aperture front edge 34. The aperture front edge can align with the aperture back edge 32 of the anchor plate to form the aperture 30. Advantageously, where the flanges meet or contact the notches there can be contact points 150 that can distribute the forces applied to the retainer bracket, such as, by a cross beam 10 arranged in the aperture. Additional embodiments can include supplemental flanges 120 and corresponding supplemental notches 140 that provide additional contact points. Each of these general components can have one or more sub-components, which will be discussed in detail below.

The components of a retainer bracket of the subject invention can comprise any suitable material or combination thereof. The factors to be considered for the choice of one or more materials for manufacture of a retainer bracket are understood by those skilled in the art. Ideally, the selected material will have a tensile strength that can maintain engagement of the components during the intended use of the retainer bracket. Thus, the materials of a retainer bracket can comprise metals, plastics, woods, glass, foams, and other materials or any combination thereof, which are known to those with skill in the art. Accordingly, the subject invention is not limited to any particular material or combination of materials. In a specific embodiment, a retainer bracket comprises steel plate suitable for attachment to a supporting structure 15 on a utility trailer 5. The steel plate can have a thickness, between a mounting side and an outer side that is between about ¼" and about 1.0". In a more specific embodiment, a supporting structure is a forward extension arm 8 of a utility trailer.

Figure 1:
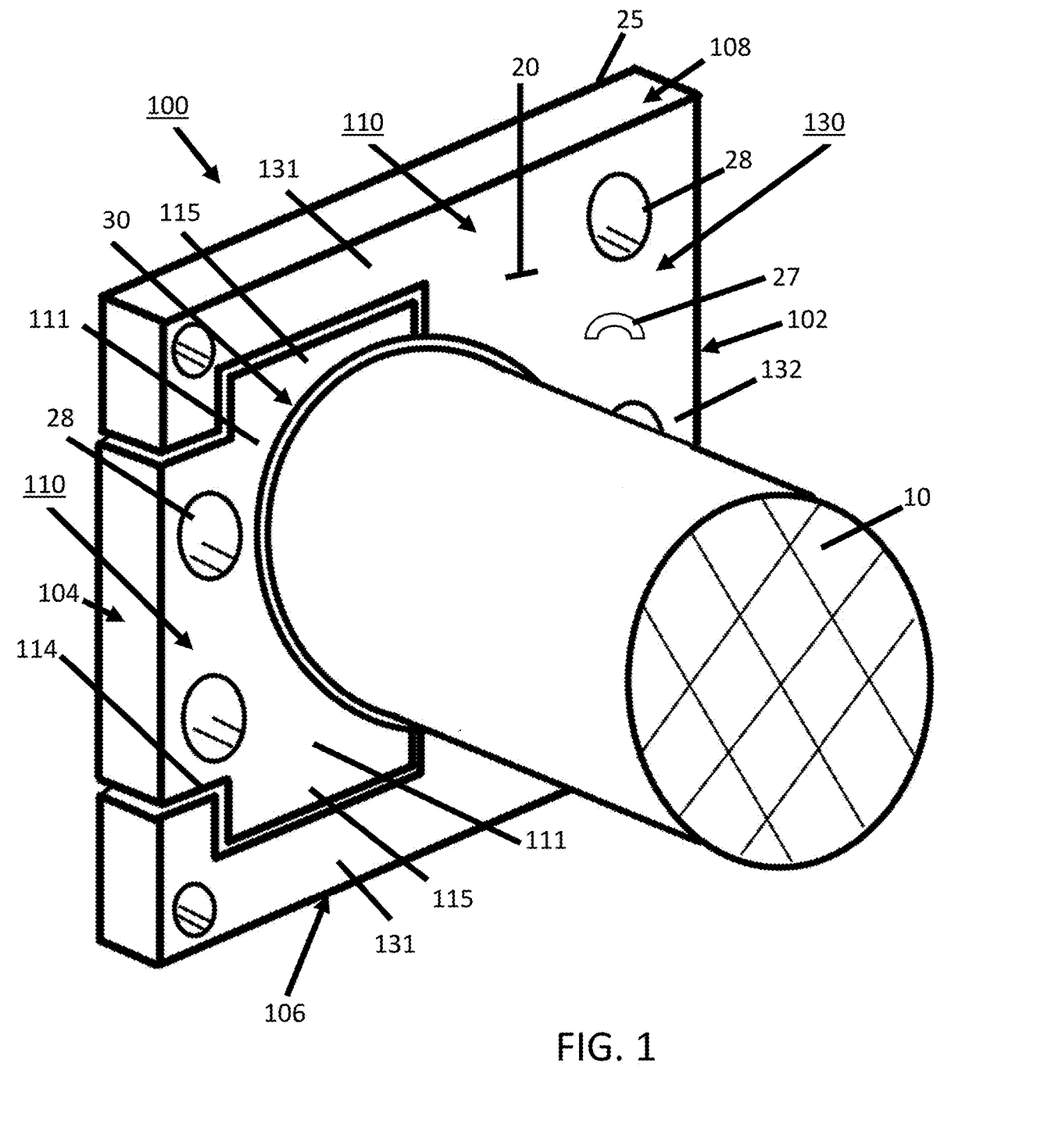
FIG. 1 illustrates a perspective view of an embodiment of the retaining plate according to the subject invention, supporting a cross beam therein. In this view, the anchor plate is position beside the lock plate.

In one embodiment, as shown in FIG. 1, a retainer bracket 100 comprises an anchor plate 110 and a lock plate 130. The anchor plate and lock plate can be joined or cooperatively engaged to form an aperture 30 for receiving a cross beam 10. An outer side 20 of the retainer bracket can be directed toward the cross beam 10 and an opposite mounting side 25 can be positioned facing or in contact with a supporting structure 15, such as, for example, a forward extension arm 8 on a utility trailer 5, as shown, for example, in FIG. 10. Either or both the first mounting side and the first outer side can have surface features 27 that facilitate attachment or contact with the supporting structure 15 or the cross beam 10, respectively. By way of non-limiting example, surface features 27 can be an extension, protrusion, rib, indentation, channel, dimple, or the like on the mounting side that contacts the supporting structure to increase frictional resistance, as shown, for example, in FIGS. 3 and 4.

Between the outer side 20 and the mounting side 25 of the retainer bracket 100 can be connector openings 28 that extend through the retainer bracket 100. Connector openings can be holes or bores, threaded or otherwise, that receive connectors for attaching the retainer bracket to the supporting structure 15. Typically, at least one of a retainer bracket and a cross beam is welded to the support structure, which inhibits the ability to later remove the cross beam. One advantage of a retainer bracket 100 of the subject invention is the modularity provided by the separate components. The cooperative engagement of those components can be used not only to connect the cross beam, but can also allow the retainer bracket to self-support the cross beam while being connected to the supporting structure with, preferably, removable connectors. Utilizing non-welded removable connectors can facilitate removal of the cross beam and one or more components of a retainer bracket 100 without adversely affecting the integrity of the supporting structure. This does not preclude welding or even the use of an adhesive or other connecting material, if that is a preferred method of attachment, but the use of removable connectors adds modularity. And, if welding is preferred, a retainer bracket 100 can still facilitate the process by self-supporting the cross beam during the welding procedure.

In one embodiment, a retainer bracket has a front edge 102, a back edge 104, a left edge 106, and a right edge 108, one or more of which can be comprised of the edges of one or both the anchor plate 110 and the lock plate 130. For example, FIGS. 1 and 2B illustrate embodiments having a back edge 104 of the retainer bracket comprised of the rear edge 116 of a tail end 113 of the anchor plate 110 and terminal edges 136 of the paired shanks 131 on lock plates, which are described below. Further, the outer side 20 of a retainer bracket 100 can comprise the first outer side 127 of the anchor plate 110 and a second outer side 141 of the lock plate 130, when cooperatively engaged, examples of which are shown in FIGS. 2A-2D. Likewise, the mounting side 25 of the retainer bracket can comprise the first mounting side 129 of the anchor plate and the second mounting side 143 of the lock plate, when cooperatively engaged, examples of which are also shown in FIG. 2A-2D.

Figure 2A:
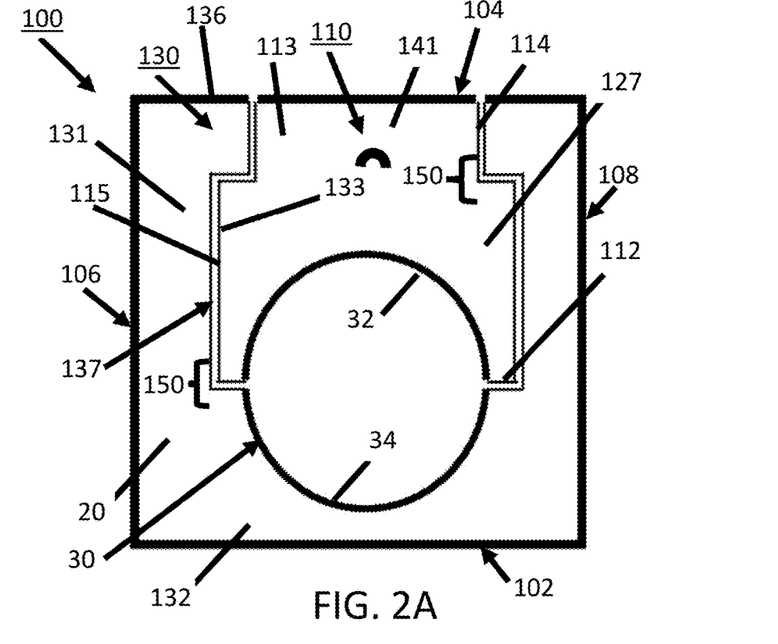
FIG. 2A shows a front elevation view.
Figure 2B:
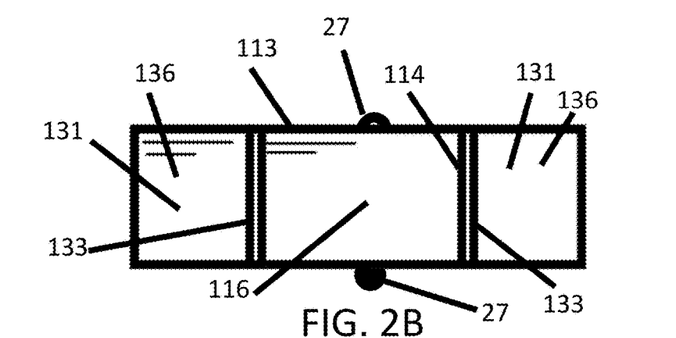
FIG. 2B shows the back edge.
Figure 2C:
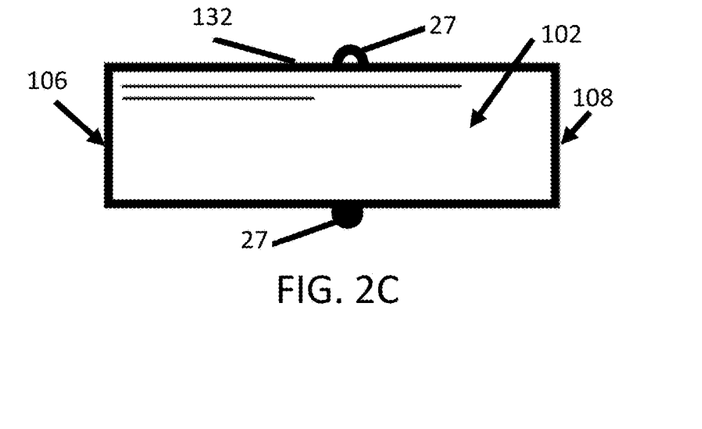
FIG. 2C shows the front edge.
Figure 2D:
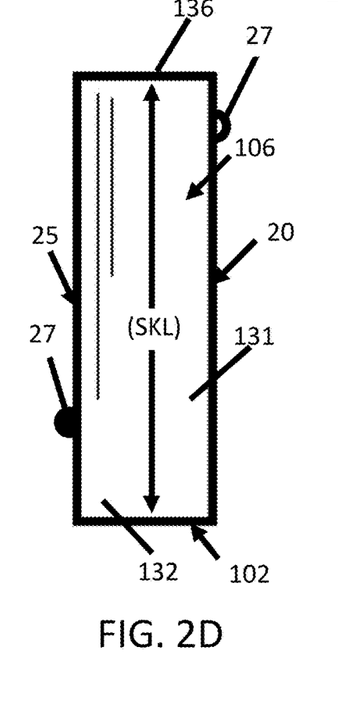
FIG. 2D shows the left edge. The right edge can be a mirror image of the left edge.
Figure 3:
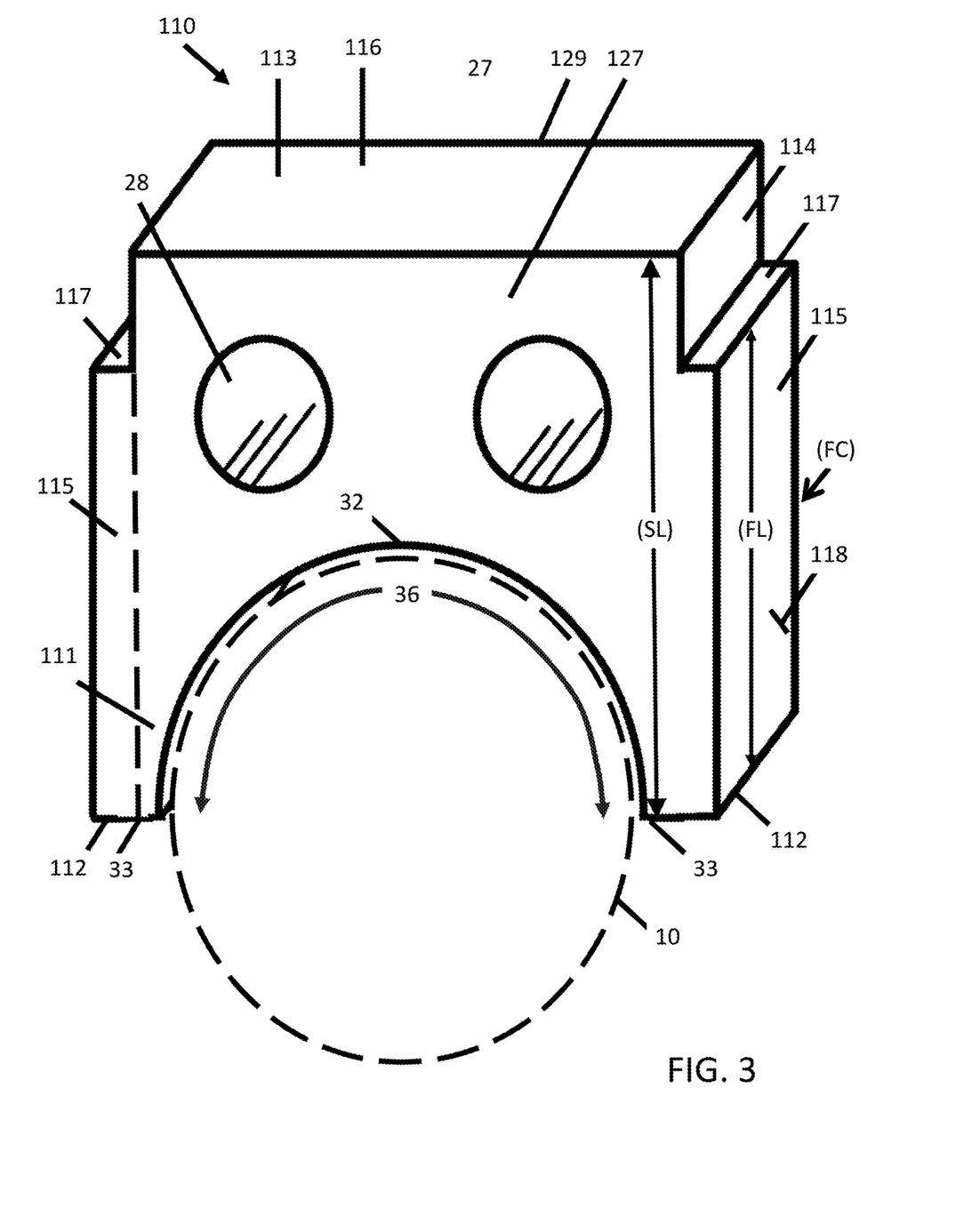
FIG. 3 illustrates a right-side, back edge perspective view of an embodiment of an anchor plate.

One embodiment of an anchor plate 110, shown, for example, in FIGS. 2A and 3, has a pair of opposite side arms 111. Each of the pair of side arms can extend from opposite ends or sides of a tail end 113 of the anchor plate and in a direction opposite to or at least approximately perpendicular to the rear edge 116 giving the anchor plate a U-shape. As shown in FIG. 3, the side arms can be substantially mirror images of each other, such that they are substantially the same size and configuration. This is not a requirement, and each side arm can have a different configuration of the features described.

Figure 4:
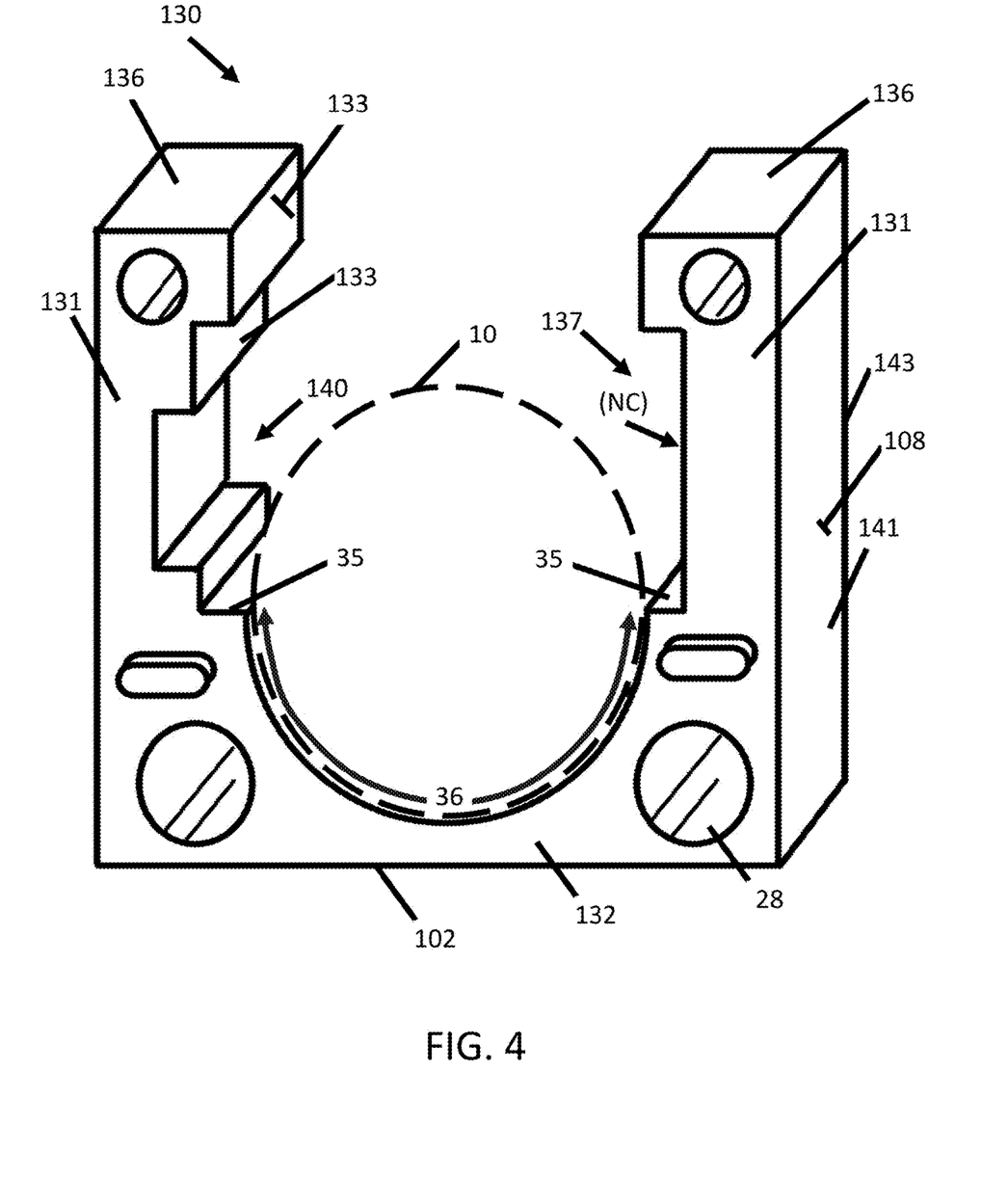
FIG. 4 illustrates a right side, back edge perspective view of an embodiment of a lock plate. Also shown are embodiments of a shank with a notch and a shank with a notch and one type of supplemental notch.
Figure 8:
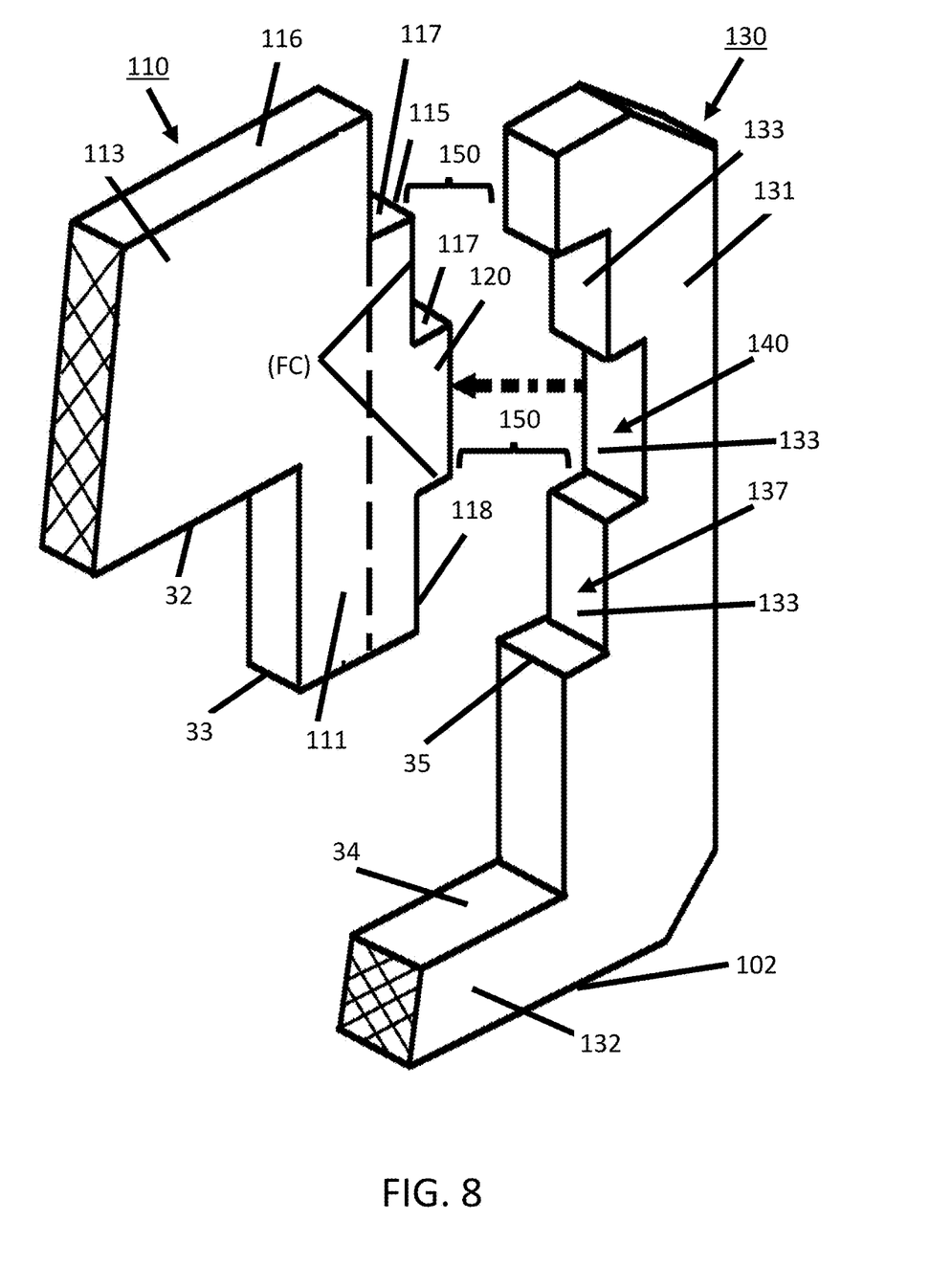
FIG. 8 illustrates a perspective view of a cross-section showing a back and left inside edge of a lock plate adjacent to an anchor plate. The dashed arrows indicate the direction of lateral motion of the lock plate for cooperatively engaging the notches with the flanges on the anchor plate. Also shown are a supplemental flange and a supplemental notch, as well as an alternatively shaped aperture.
Figure 9:
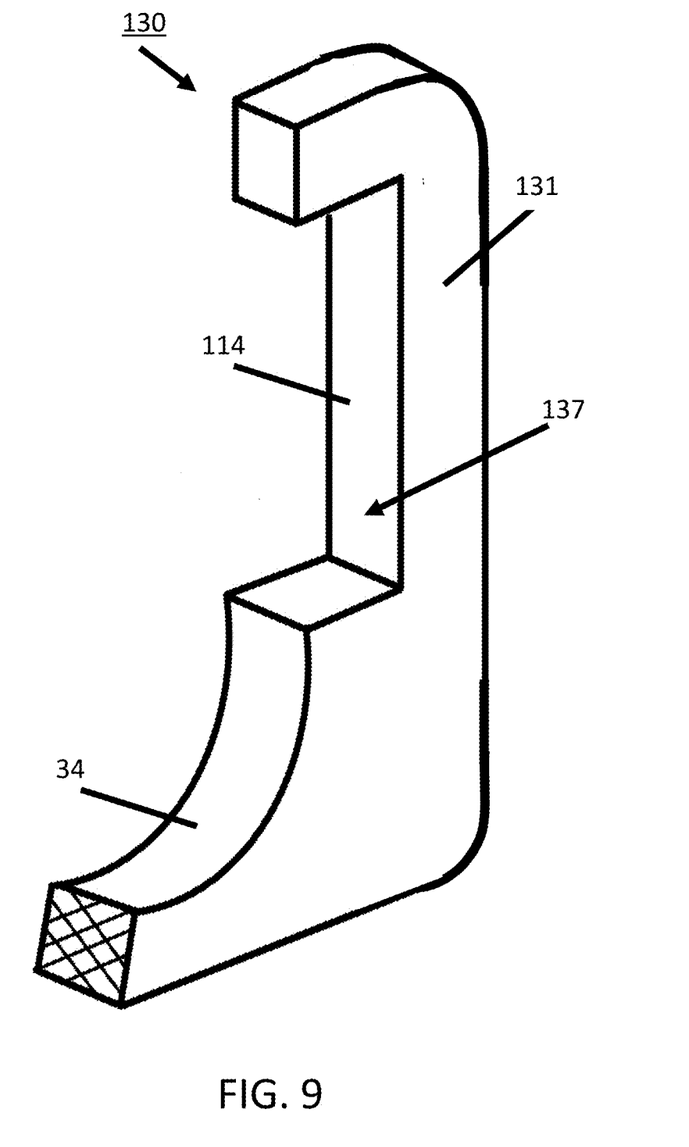
FIG. 9 shows as cross-section of an alternative embodiment of a lock plate.

In one embodiment, the side arms have a side arm length (SL) that extends between the rear edge 116 of the tail end 113 and a front shoulder 112, as shown, for example, in FIG. 3. Each side arm can have an outer edge 114. Between the paired side arms and opposite the tail end 113, there can be an aperture back edge 32. The aperture back edge can define a portion of an aperture 30 in which the cross beam is held in the retainer bracket 100. In one embodiment, the aperture back edge has back terminal ends 33 and a circumference 36 therebetween that can have the same or approximately the same shape as a circumference of at least a portion of the cross beam. When the lock plate 130 is cooperatively engaged with the anchor plate 110, the aperture is formed therebetween. In one embodiment the aperture back edge 32 has a semi-circular circumference 36. In a more specific embodiment, the circumference of the aperture back edge defines a semi-circular arc of approximately 180°. In a further specific embodiment, the lock plate and anchor plate, when cooperatively engaged, form therebetween an aperture with a circular circumference in the retainer bracket 100. An example of this is shown in FIGS. 2A and 4. An aperture can have alternative circumference shapes, such as, for example, square or rectangular or other shapes with straight edges. FIG. 8 illustrates portions of an aperture with edges that are not curved.

In one embodiment, at least one side arm 111 of the pair of side arms comprises a flange 115 that is contiguous with and extends from the outer edge 114, as shown, for example, in FIGS. 1, 2A, 3, and 6. Further, a flange can have a flange length (FL) that is smaller than the side arm (SL) 111, such that at least one side edge or shoulder 117 of a flange forms an angle with the outer edge 114, which can be seen, for example, in FIGS. 3 and 8. For example, the shoulder of a flange can be perpendicular to the outer edge, as shown, for example, in FIGS. 6 and 8. The shoulder of a flange can also have a non-perpendicular angle with the outer edge 114, as shown, for example, on the lower flange in FIG. 7.

In one embodiment, there is a shoulder nearer the tail end 113 of the anchor plate, as shown, for example, in FIGS. 1 and 3. As previously mentioned, the flange can engage with a notch 137 on the lock plate 130, which joins or cooperatively engages the lock plate with the anchor plate and can facilitate the lock plate in supporting the cross beam. Thus, while a flange can have any shape circumference, the flange circumference (FC) preferably will have at least one shoulder configured to secure the lock plate to the anchor plate without, or prior to, connectors being utilized to attach the retainer bracket to the supporting structure. As shown in the embodiment in FIGS. 3 and 7, a shoulder can comprise a flat surface that forms an angle, perpendicular or otherwise, with the outer edge 114 of the side arm. As discussed further below, the shoulder is part of a contact point 150. In one embodiment, the notch is formed so that the terminal edge 136 of a shank 111, discussed further below, extends over a contact point or shoulder 117 of a flange cooperatively engaged with a notch. This can provide a hook-like configuration that helps support the lock plate on the anchor plate and inhibits removal in a direction other than lateral or sideways to the anchor plate. In a more specific embodiment, the notch hooks around a flange to inhibit the lock plate from disengaging from the anchor plate when force is applied to the walls of the aperture.

In a further embodiment, there are one or more supplemental flanges 120 on at least one of the side arms 111. A supplemental flange can have the same configuration as a flange, but smaller dimensions. A supplemental flange can also have a different configuration than a flange, and, possibly, smaller dimensions.

Figure 7:
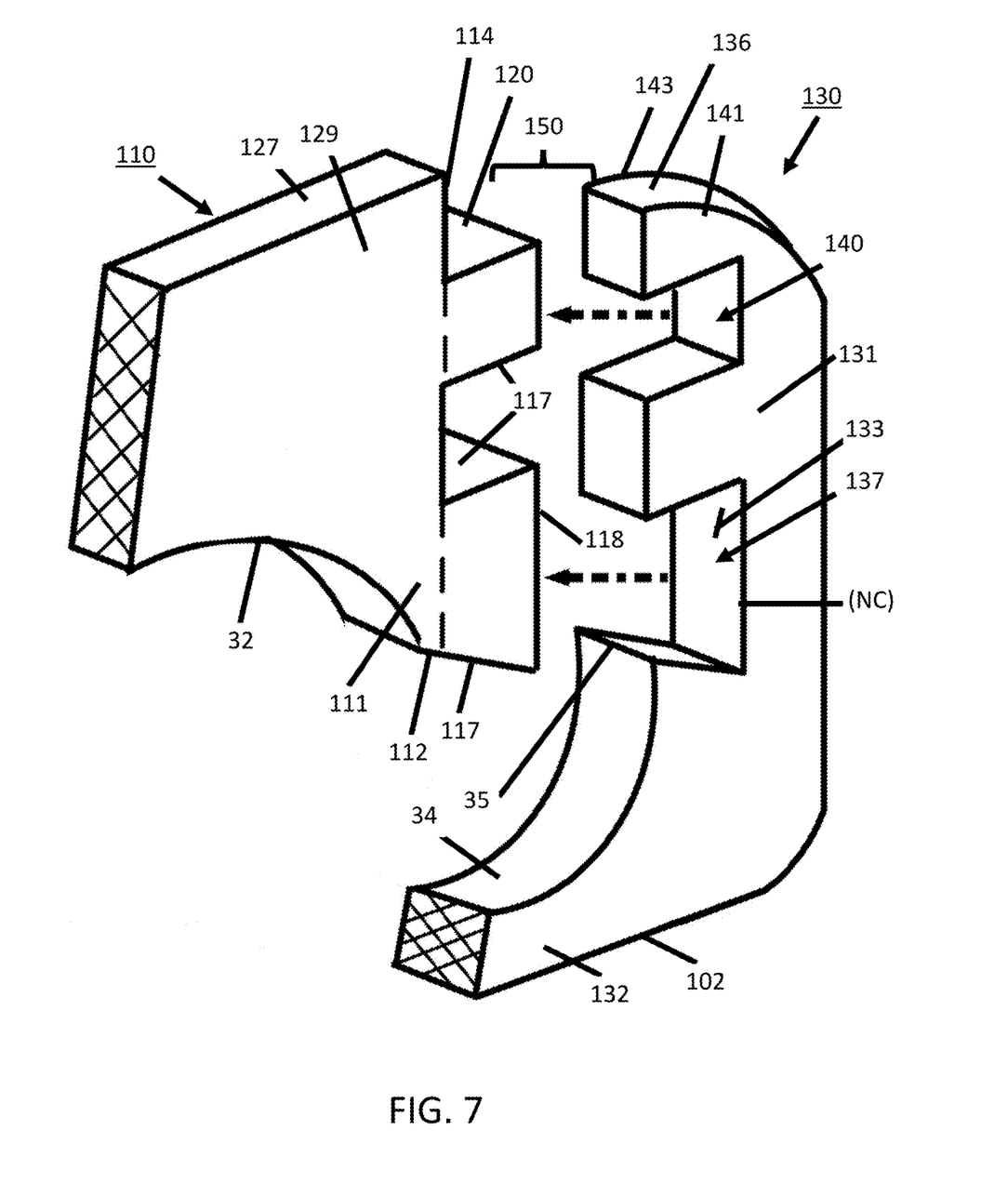
FIG. 7 illustrates a perspective view of a cross-section showing a mounting side and right inside edge of a lock plate adjacent to an anchor plate. The dashed arrows indicate the direction of lateral motion of the lock plate for cooperatively engaging the notches with the flanges on the anchor plate. Also shown is an alternative embodiment of a flange angle of a contact point.

In one embodiment, a supplemental flange 120 is arranged next to or side-by-side with the flange 115 on the outer edge 114 of a side arm. FIG. 7 illustrates a non-limiting example of an anchor plate 110 with a flange and a supplemental flange both arranged on the outer edge of the side arm 111. In an alternative embodiment, one or more supplemental flanges are contiguous with a flange, such that the supplemental flange is arranged on a flange outer edge 114 rather than the outer edge of the side arm. In this embodiment, a flange extends from the outer edge 114 of a side arm and the one or more supplemental flanges extend from the flange outer edge 118, such that the flange and the supplemental flange are contiguous with each other. FIG. 8 illustrates a non-limiting example of a supplemental flange 120. In one embodiment, the supplemental flange can extend in the same plane as the flange, such that the flange and the supplemental flange are planar between the first mounting side 129 and the first outer side 127, an example of which is shown in FIG. 8. For the sake of clarity, reference herein to a flange is intended to include any one or more supplemental flanges.

Figure 6:
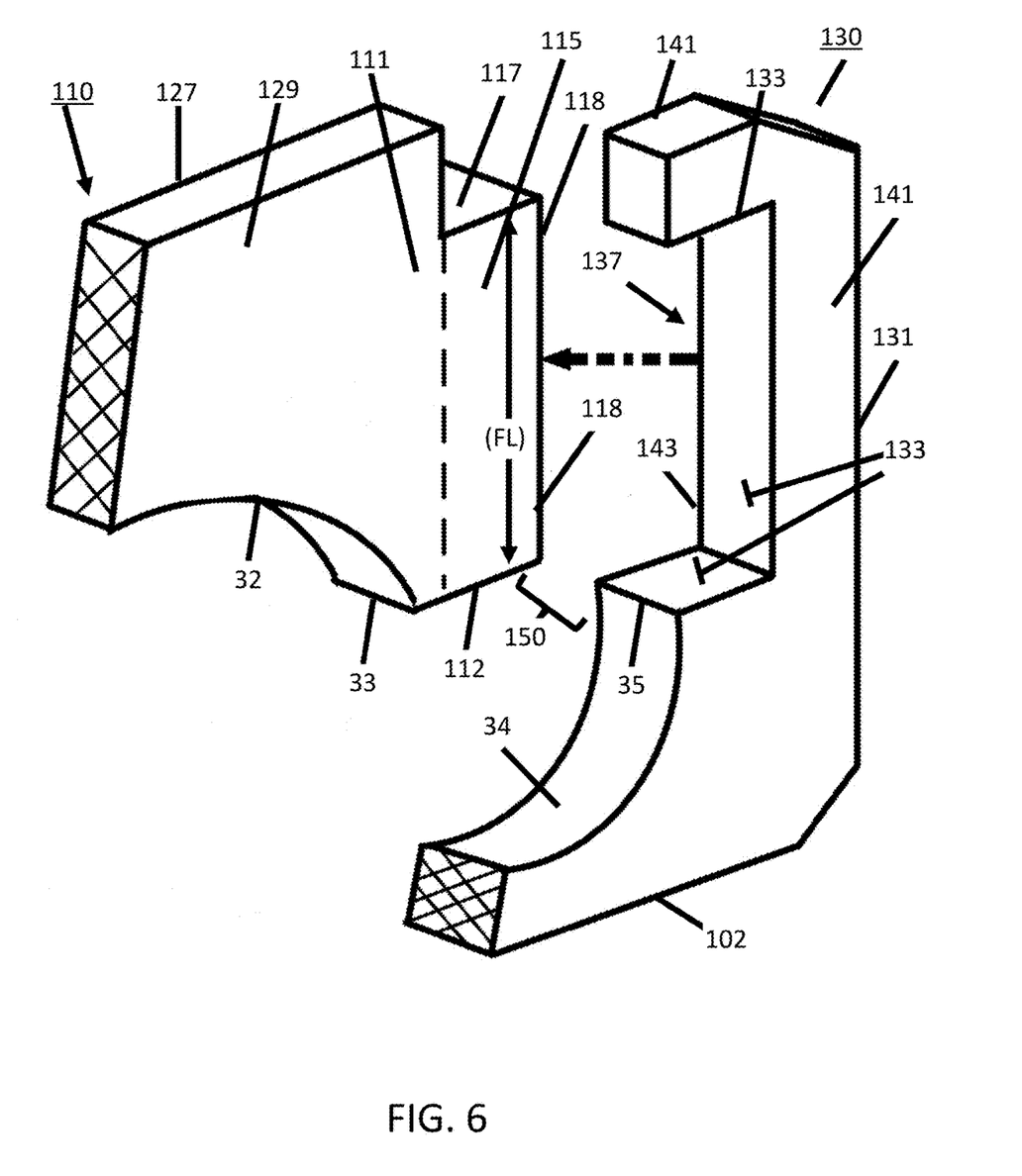
FIG. 6 illustrates a perspective view of a cross-section showing an outer side and inside edge of an embodiment of a lock plate adjacent an embodiment of an anchor plate. The dashed arrows indicate the direction of lateral movement of the lock plate for cooperatively engaging the notches with the flanges on the anchor plate.

Turning now to the lock plate 130, FIGS. 2A, 4, 6, 7, and 8, illustrate non-limiting examples of lock plates that can be connected, overlapped, interdigitated or otherwise cooperatively engaged with an anchor plate 110. As shown in FIG. 4, the configuration of a lock plate can be similar to that of an anchor plate, in that it can also have a U-shape, but includes features that allow the lock plate to cooperatively engage with the anchor plate. Preferably, such cooperative engagement can inhibit the lock plate from disengaging from the anchor plate by movement in a direction towards any of the front edge 102, back edge 104, left edge 106, or right edge 108. More particularly, the cooperative engagement is achieved when the anchor plate and lock plate are moved one toward or crosses over the other in a sideways or lateral direction, such that a mounting side of one is moved toward an outer side of the other or vice versa. Non-limited examples of this are shown in FIGS. 6 and 7, where the dashed arrows indicate the direction of movement between the respective anchor plates and the lock plates. In other words, a shoulder of a flange moves parallel to an inside edge 133 of a notch, as explained below.

In one embodiment, a lock plate has a cap end 132 with the front edge 102. In a further embodiment, the lock plate has paired shanks 131. Each of the pair of shanks can extend from opposite ends or sides of the cap end and in a direction opposite to or perpendicular to the front edge 102 giving the lock plate a U-shape. The shanks can have terminal edges 136 that extend over or overlap a notch 137 in the shank inside edge 133. As shown, in FIGS. 4, 6, 7, and 8, this can form a hook-like feature at about the terminal end of the shank, which allows the shank to go at least partially around, ideally fully around, a flange of the anchor plate. In one embodiment, the tail end 113 of the anchor plate is between the terminal edges of the shank. The paired shanks can further define the left edge 106 and right edge 108, respectively, of the retainer bracket, as shown, for example, in FIGS. 2C and 4. In one embodiment, a shank has shank length (SKL), as shown, for example, in FIG. 2D, which is a distance between the front edge 102 and a terminal edge 136 of the shank. In one embodiment, the shank lengths (SKL) of the paired shanks are the same. In a further embodiment, the shank lengths are parallel or approximately parallel.

Figure 5:
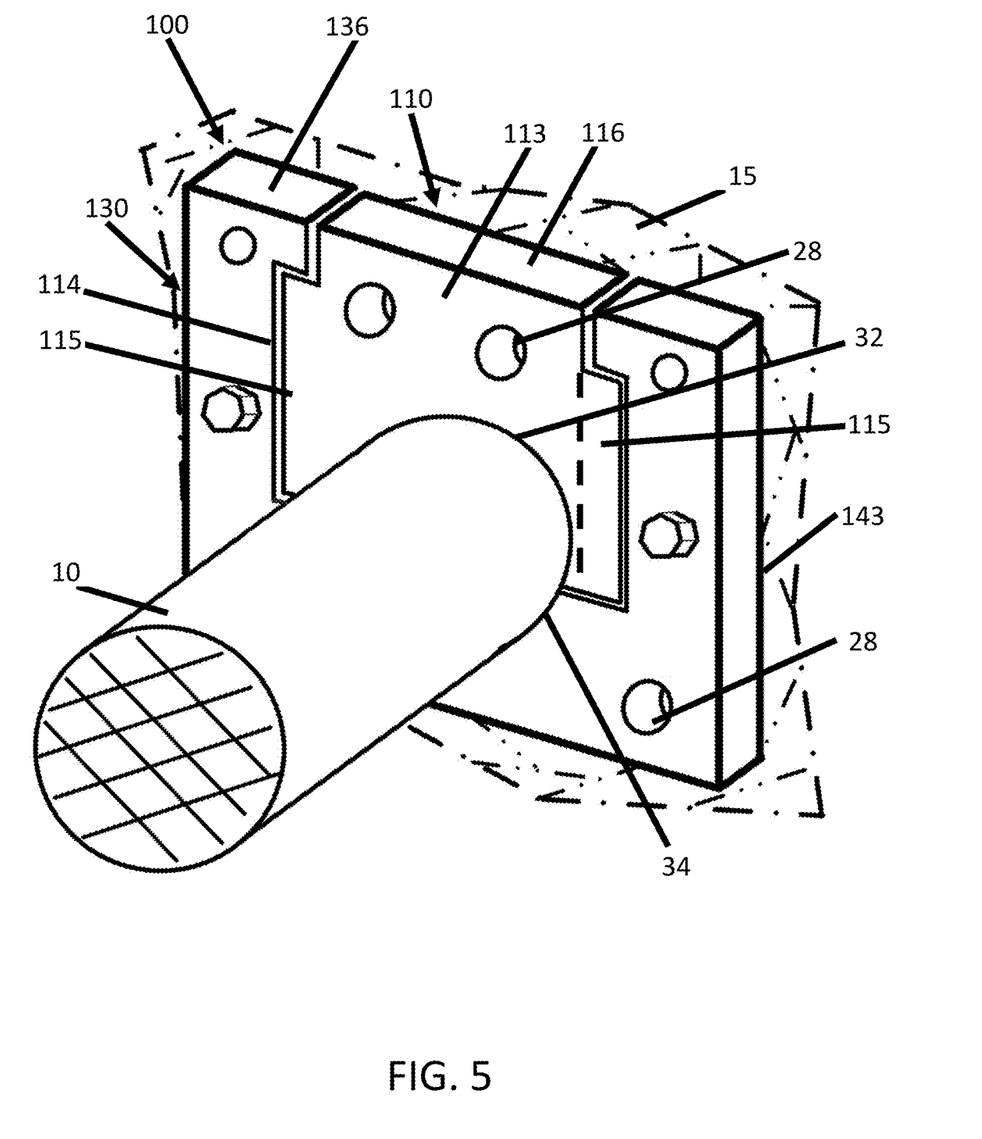
FIG. 5 illustrates a perspective view of an embodiment of the retaining plate in FIG. 1 secured to a supporting structure with a cross beam in the aperture. In this view, the anchor plate is arranged above the lock plate.

In a further embodiment, the lock plate 130 comprises an aperture front edge 34 that is opposite to the front edge 102 and located between the paired shanks 131. Each end of the aperture front edge can comprise a front terminal end 35. FIGS. 4, 6, 7, and 8 show examples of aperture front edges and the associated front terminal ends. The aperture front edge 34 can form a portion of the aperture 30, such that, when the lock plate 130 is cooperatively engaged with the anchor plate 110 the front terminal ends 35 align with the back terminal ends 33 on the anchor plate. Thus, when the anchor plate is cooperatively engaged with the lock plate, the aperture 30 can be formed therebetween. In one embodiment the aperture front edge 34 has a semi-circular circumference. In a specific embodiment, the circumference 36 of the aperture front edge defines a semi-circular arc of approximately 180°. In a further specific embodiment, the lock plate and anchor plate, when cooperatively engaged, such that their respective front terminal ends 35 abut the back terminal ends 33, form therebetween a circular aperture 32 in the retainer bracket 100. FIGS. 1 and 5 show non-limiting examples of a cross beam held in an aperture.

In one embodiment, a shank 131 comprises an inside edge 133 adjacent to the aperture front edge 34. The inside edges of the paired shanks can face each other over the aperture front edge. In a further embodiment, the inside edge, or at least a portion thereof, has an indentation or notch 137, as shown, for example, in FIGS. 1, 4, 6, 7, and 8. The notches in the paired shanks can likewise face each other or across the aperture front edge. In one embodiment, the shanks are mirror images of each other, as shown, for example in FIGS. 1 and 2A. In an alternative embodiment, the shanks are not mirror images and each can have different or at least slightly different configuration or feature, which is shown, for example, in FIG. 4, where the left side shank is configured with a notch for receiving both a flange 115 and a supplemental flange 120 and the right side shank is configured to receive only a flange.

In a further embodiment, a notch 137 is positioned to receive therein a flange 115 on an anchor plate 110, which, as stated above, can include a supplemental flange 120. It can be advantageous for the notch circumference (NC) to interdigitate with the flange circumference (FC). It can be further advantageous if such interdigitation is achieved with minimal clearance or distance between the flange and the notch. In one embodiment, the flange and notch form a tight fit, such that, when interdigitated, the shoulder 117 of a flange 115 contacts the inside edge 133 of a notch to form a contact point 150.

In one embodiment, a supplemental notch 140 is arranged next to or side-by-side with the notch 137 on the inside edge 133 of a shank, such that each is independent of the other. FIG. 7 illustrates a non-limiting example of a lock plate 130 with a notch and a supplemental notch both arranged on the inside edge of the shank.

In an alternative embodiment, one or more supplemental notches 140 are arranged on or are contiguous with a notch. In one embodiment, a supplemental notch is arranged in the inside edge 133 of a notch rather than the inside edge 133 of the shank. More specifically, a notch is formed in the inside edge of a shank and the one or more supplemental notches are formed within the inside edge 133 of a notch, such that the notch and the inside edges thereof are contiguous with the supplemental notch and the inside edges thereof. FIG. 8 illustrates a non-limiting example of a supplemental notch 140 contiguous with a notch. The supplemental notch can extend in the same plane as the notch, such that the notch and the supplemental notch are in the same plane between a second outer side 141 and a second mounting side 143 of the lock plate 130, an example of which is shown in FIG. 8. For the sake of clarity, reference herein to a notch is intended to include any one or more supplemental notches.

To engage a flange 115 with a notch, a lock plate 130 can be placed to one side of an anchor plate, a non-limiting example of which is shown in FIGS. 7 and 8, and the lock plate can be moved laterally or sideways towards the anchor plate or vice versa, depending, for example, on which one is attached to the supporting structure 15. With the notches aligned with the flanges, the second mounting side 143 of the lock plate can slide sideways and past the first outer side 127 of the anchor plate 110 until the one or more flanges 115 cooperatively engage with the one or more notches 137 and the side arms 111 and shanks 131 are parallel or approximately parallel or at least side-by-side. Once engaged, the lock plate can be incapable of removal from the anchor plate, except when the lock plate is moved laterally or sideways relative to the anchor plate. This is because the interdigitation of the flanges and notches inhibit the lock plate from being removed by pushing or pulling towards any of the edges of the retainer bracket. Likewise, only a lateral motion can disengage the anchor plate from the lock plate or vice versa.

In one embodiment, where a flange 115 abuts against an inside edge 133 of a notch 137, there is a contact point 150, as shown, for example in FIGS. 6, 7 and 8. In a specific embodiment, a contact point is where a flange shoulder 117 abuts an inside edge 133 of a notch. As mentioned above, it can advantageous if the flange and the notch can interdigitate with minimal clearance therebetween. Therefore, in a still more specific embodiment, a flange shoulder contacts or abuts a corresponding inside edge 133 of a notch, such that all or most of the flange shoulder contacts or abuts the inside edge of the notch wall, to form a contact point.

With a typical retainer bracket known in the art, a cross beam exerts a force on a relatively small area and from that small area the force is translated to other immediate areas of the retainer bracket. Advantageously, when a force is exerted on a retainer bracket 100, according to the subject invention, such as by a cross beam 10 secured in the aperture 30 thereof, all or at least most of the force can be translated to one or both paired shanks or one or both of the paired side arms and subsequently to the one or both paired sidearms 111 or the one or both paired shanks, respectively, through the contact points between the flanges and the notches. The contact points can advantageously increase the surface area over which the force is distributed.

The flanges and notches provide a further advantage, in that, when the lock plate is engaged with the anchor plate, a force applied to the aperture is inhibited from separating these components. In other words, a force applied in a direction toward any one or more of the front, back, left, and right edge is inhibited from separating the anchor plate and the lock plate. Separation of these components can be achieved, advantageously, by lateral movement of the components, where one component, for example, the lock plate, is moved sideways or laterally to the anchor plate, whereby the mounting side of one crosses or passes the outer side of the other.

Figure 10:
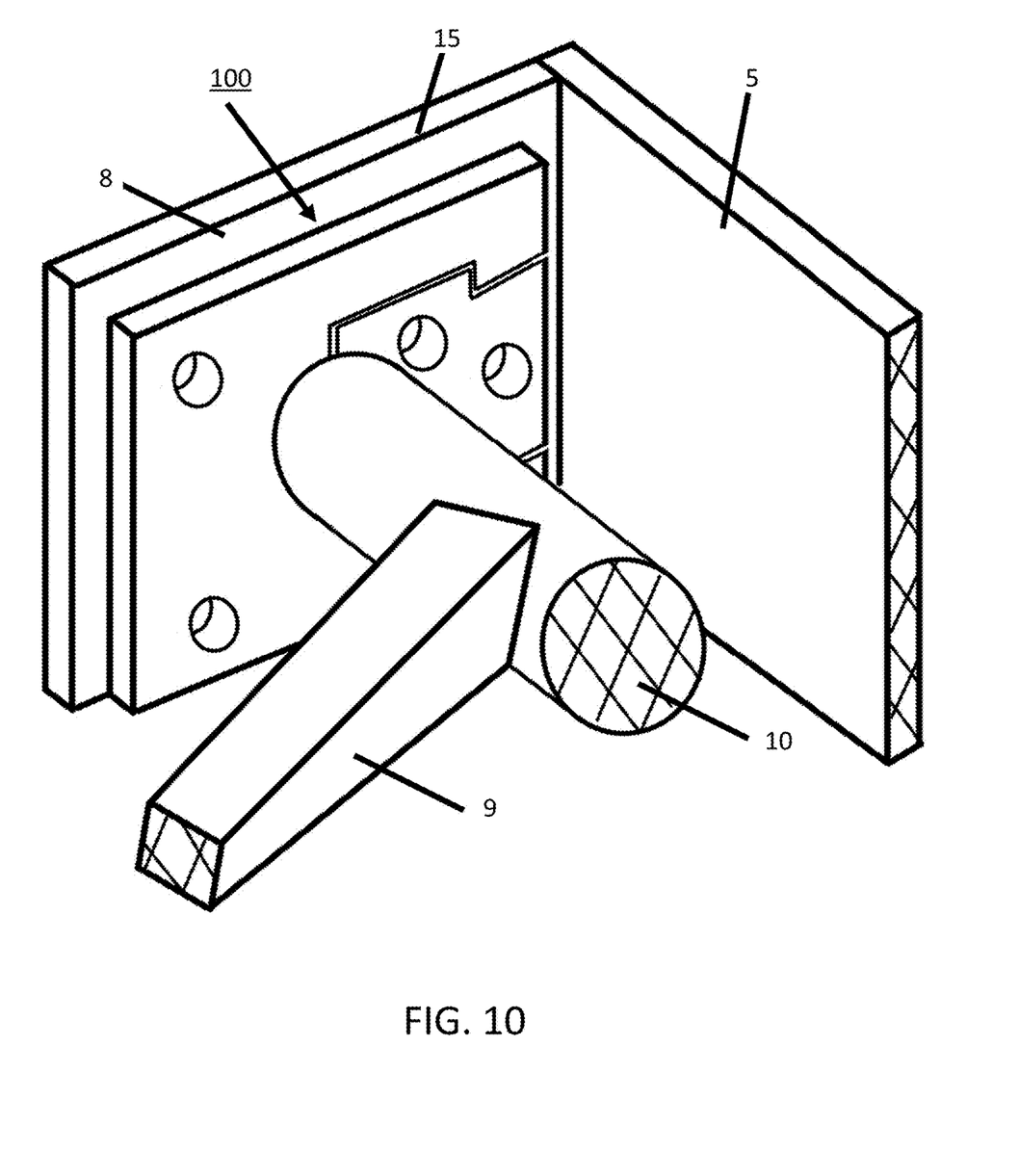
FIG. 10 illustrates a perspective view of a retainer bracket, according to the subject invention, secured to a forward extension arm of a utility trailer.

In a particular embodiment, the retainer bracket is utilized to connect a tubular cross beam 10 to a forward extension arm 8 of a drop body utility trailer 5. A drop body trailer is a specialized trailer in which the body can be lowered for loading and raised for towing. It can be beneficial if the trailer tongue 9 can remain attached to the hitch on a tow vehicle while the body is lowered and raised. This can be facilitated if the tongue is supported on the tubular cross beam, as shown in FIG. 10. The retainer bracket can likewise have a circular aperture that allows the cross beam to rotate during lowering and raising of the trailer body, allowing the tongue to remain attached to the hitch.

There are several ways a retainer bracket 100 of the subject invention can be attached to a supporting structure 15. A person of skill in the art would be able to determine the most effective method for attachment. Ideally, the supporting structure is prepared in advance with the holes, bores, or other spaces that will align with connector openings 28 on the retainer bracket for receiving the connectors. Likewise, the appropriate cross beam can be pre-selected for engaging with the aperture 30.

In one embodiment, the anchor plate 110 is attached to the supporting structure 15 with the first mounting side 129 there against. The paired side arms 111 can be directed horizontally, vertically, or any angle therebetween that provides access to the aperture back edge 32. At this point, the cross beam 10 can be placed between the anchor plate and the lock plate. For example, the cross beam can be placed against the aperture back edge. The lock plate 130 can be placed against the cross beam with the aperture front edge 34 against the cross beam and the second mounting side 143 of the lock plate facing the first outer side 127 of the anchor plate. The paired shanks 131 of the lock plate can be directed opposite to the direction of the side arms, but parallel or approximately parallel thereto. The lock plate can slide towards the anchor plate with the one or more notches 137 aligned with the one or more flanges on the side arms. The lock plate can slide past the first outer side 127 of the anchor plate until the second mounting side 143 of the lock plate is against the mounting surface 15 and the one or more notches are engaged with the one or more flanges on the anchor plate. At this point, the anchor plate is within the lock plate and the lock plate can be released and will remain cooperatively engaged with the anchor plate, holding the cross beam in place, as well. Connectors can be used to secure the lock plate to the supporting structure. In an alternative procedure, the cross beam can be placed against the aperture front edge 34 of the lock plate, instead of the aperture back edge 32 of the anchor plate. The cross beam can be held against the aperture back edge, while the lock plate slides towards the anchor plate.

In another embodiment, the lock plate 130 is attached to the supporting structure 15 with the second mounting side 143 there against. The paired shanks 131 can be directed horizontally, vertically, or any angle therebetween that provides access to the aperture front edge 34. At this point, the cross beam 10 can be placed between the anchor plate and the lock plate. For example, the cross beam can be placed against the aperture front edge. The anchor plate 110 can be placed against the cross beam with the aperture back edge 32 against the cross beam and the first mounting side 129 of the anchor plate facing the second outer side 141 of the anchor plate. The paired side arms 111 of the anchor plate can be directed opposite to the direction of the paired shanks, but parallel or approximately parallel thereto. The anchor plate can slide towards the lock plate with the one or more flanges 115 aligned with the one or more notches 137 on the shanks. The anchor plate can slide laterally or sideways past the second outer side 141 of the lock plate until the first mounting side 127 of the anchor plate is against the mounting surface 15 and the one or more flanges are engaged with the one or more notches on the lock plate. At this point, the anchor plate is within the lock plate and can be released to remain cooperatively engaged with the lock plate, holding the cross beam in place, as well. Connectors can be used to secure the anchor plate to the supporting structure. In an alternative procedure, the cross beam can be placed against the aperture back edge 32 of the anchor plate, instead of the aperture front edge 32 of the anchor plate. The cross beam can be held against the aperture back edge, while the anchor plate slides towards the lock plate.

It should be understood that examples and embodiments described herein are for illustrative purposes only and that various modifications or changes in light thereof will be suggested to persons skilled in the art and are to be included within the spirit and purview of this application.

What is claimed is:

1. A retainer bracket, configured to secure a cross beam to a supporting structure, comprising:
    an anchor plate comprising a first mounting side and an opposite first outer side, with a tail end and an opposite aperture back edge therebetween;
    a side arm between the tail end and a back terminal end, wherein the side arm comprises a side arm length that has an outer edge;
    a flange that is contiguous with and extends outward on the outer edge of the side arm, wherein the flange has a flange length that is shorter than the side arm length, such that there is a shoulder on the flange that is angled to the outer edge;
    a lock plate comprising,
    a second mounting surface and an opposite second outer side with a cap end and an opposite aperture front edge therebetween, wherein the aperture front edge comprises a front terminal end;
    a shank between the cap end and a terminal edge, wherein the shank further comprises an inside edge and a shank length that is longer than the flange length, and
    a notch, within the inside edge, such that the terminal edge of the shank overlaps the notch in a hook-like configuration, whereby the angled shoulder of the flange abuts the notch to form a contact point with the notch;
    such that, when the anchor plate and lock plate move laterally relative to each other, the flange cooperatively engages with the notch at the contact point and the back terminal end aligns with the front terminal end, which aligns the aperture back edge with the aperture front edge to form the retainer bracket with an aperture therein that secures the cross beam to the supporting structure.

2. The retainer bracket, according to claim 1, further comprising a supplemental flange on at least one of the outer edge of the side arm, such that the flange has a flange circumference and the supplemental flange has a separate flange circumference, and a flange outer edge, such that the flange and supplemental flange are contiguous and have a combined flange circumference.

3. The retainer bracket, according to claim 2, further comprising a supplemental notch in at least one of the inside edge of the shank, such that the notch and the supplemental notch are separate and each has a notch circumference, and the inside edge of a notch, such that the inside edge of the notch is contiguous with the inside edge of the supplemental notch and the notch and supplemental notch have a combined notch circumference.

4. The retainer bracket, according to claim 1, further comprising a connector opening, configured to receive a connector, in at least one of the anchor plate and the lock plate, for securing the retainer bracket to the supporting structure.

5. The retainer bracket, according to claim 1, wherein the angle of the shoulder is approximately perpendicular to the outer edge of the side arm.

6. The retainer bracket according to claim 1, further comprising a back edge that comprises the tail end of the anchor plate and the terminal edge of the shank.

7. The retainer bracket according to claim 1, further comprising a mounting side comprising the first mounting side of the anchor plate and the second mounting side of the lock plate.

8. A method for securing a cross beam to a supporting structure, the method comprising:
obtaining a retainer bracket comprising;
an anchor plate comprising,
a first mounting side and an opposite first outer side, with a tail end and an opposite aperture back edge therebetween a side arm between the tail end and a back terminal end, wherein the side arm has an outer edge,
a flange contiguous with and extending from the outer edge of the side arm, wherein the flange has a shoulder at an angle to the outer edge;
a lock plate comprising,
a second mounting surface and an opposite second outer side with a cap end and an opposite aperture front edge therebetween, wherein the aperture front edge comprises a front terminal end;
a shank between the cap end and a terminal edge, wherein the shank further comprises an inside edge, and
a notch, within the inside edge;
wherein the method comprises;
securing the anchor plate with the first mounting side against the supporting structure;
positioning the cross beam between the anchor plate and the lock plate, wherein the second mounting side of the lock plate is directed toward the first outer side of the anchor plate; and
moving the lock plate over the first outer side of the anchor plate, with the notch aligned with the flange, until the second mounting side of the lock plate is against the supporting structure, whereby the cross beam is secured in the aperture.

9. The method, according to claim 8, wherein the retainer bracket comprises a connector opening, configured to receive a removable connector, and the method further comprises securing at least one of the lock plate and the anchor plate of the retainer bracket to the supporting structure with a removable connector through the connector opening.

10. A method for securing a cross beam to a supporting structure, the method comprising:
obtaining a retainer bracket comprising;
an anchor plate comprising,
a first mounting side and an opposite first outer side, with a tail end and an opposite aperture back edge therebetween
a side arm between the tail end and a back terminal end, wherein the side arm has an outer edge,
a flange contiguous with and extending from the outer edge of the side arm, wherein the flange has a shoulder angled to the outer edge;
a lock plate comprising,
a second mounting surface and an opposite outer side with a cap end and an opposite aperture front edge therebetween, wherein the aperture front edge comprises a front terminal end;
a shank between the cap end and a terminal edge, wherein the shank further comprises an inside edge, and
a notch, within the inside edge;
wherein the method comprises;
securing the lock plate with the second mounting side against the supporting structure;
positioning the cross beam between the lock plate and the anchor plate, wherein the first mounting side of the anchor plate is directed toward the second outer side of the lock plate; and
moving the anchor plate over the second outer side of the lock plate, with the flange aligned with the notch, until the first mounting side of the anchor plate is against the supporting structure, whereby the cross beam is secured in the aperture.

11. The method, according to claim 10, wherein the retainer bracket comprises a connector opening, configured to receive a removable connector, and the method further comprises securing the retainer bracket to the supporting structure with a removable connector through the connector opening.

12. A utility trailer, configured to be towed with a tongue attached to a cross beam, comprising:
an anchor plate comprising,
a first mounting surface and an opposite first outer side, with a tail end and an opposite aperture back edge therebetween;
a side arm between the tail end and a back terminal end, wherein the side arm has a side arm length comprising an outer edge,
a flange that is contiguous with and extends outward on the outer edge of the side arm, wherein the flange has a flange length that is shorter than the side arm length, such that there is a shoulder on the flange that is at an angle to the outer edge;
a lock plate comprising a second mounting surface and an opposite second outer side with a cap end and an opposite aperture front edge therebetween, wherein the aperture front edge comprises a front terminal end;
a shank between the cap end and a terminal edge, wherein the shank further comprises an inside edge and a shank length that is longer than the flange length; and
a notch, within the inside edge, such that the terminal edge of the shank overlaps the notch in a hook-like configuration, whereby the shoulder of the flange and the notch form a contact point;

such that, when the anchor plate and the lock plate move laterally relative to each other, the flange cooperatively engages with the notch at a contact point and the back terminal end aligns with the front terminal end, which aligns the aperture back edge with the aperture front edge to form the retainer bracket with an aperture therein that secures the cross beam.

13. The utility trailer, according to claim 12, wherein the retainer bracket further comprises a supplemental flange on at least one of the outer edge of the side arm, such that the flange has a flange circumference and the supplemental flange has a separate flange circumference, and a flange outer edge, such that the flange and supplemental flange are contiguous and have a combined flange circumference.

14. The utility trailer, according to claim 13, wherein the retainer bracket further comprises a supplemental notch in at least one of the inside edge of the shank, such that the notch and supplemental notch are separated and each has a notch circumference, and the inside edge of a notch, such that the inside edge of the notch is contiguous with the inside edge of the supplemental notch and the notch and the supplemental notch have a combined notch circumference.

15. The utility trailer, according to claim 12, wherein the retainer bracket further comprises a connector opening, configured to receive a connector, in at least one of the anchor plate and the lock plate.

16. The utility trailer, according to claim 12, wherein the angle of the shoulder of the flange is approximately perpendicular to the outer edge.

17. The retainer bracket according to claim 12, wherein the aperture facilitates rotation of the cross beam about a longitudinal axis thereof.

18. The retainer bracket according to claim 12, further comprising a back edge that comprises the tail end of the anchor plate and the terminal edge of the shank.

19. The retainer bracket according to claim 12, further comprising a mounting side comprising the first mounting side of the anchor plate and the second mounting side of the lock plate.

\* \* \* \* \*